Jan. 28, 1941.     W. W. GLEASON     2,230,109
SPRING ASSEMBLY AND SPRINGS THEREFOR
Filed Sept. 22, 1938     2 Sheets-Sheet 2
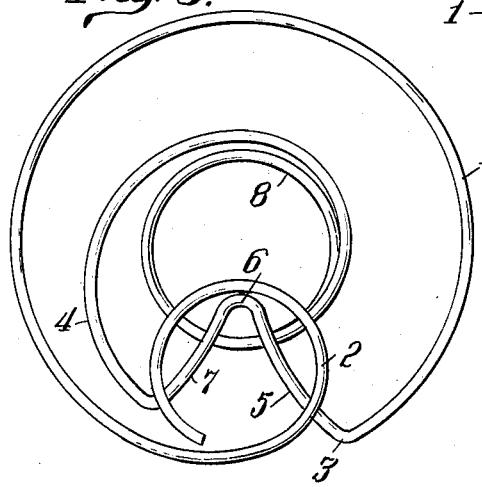
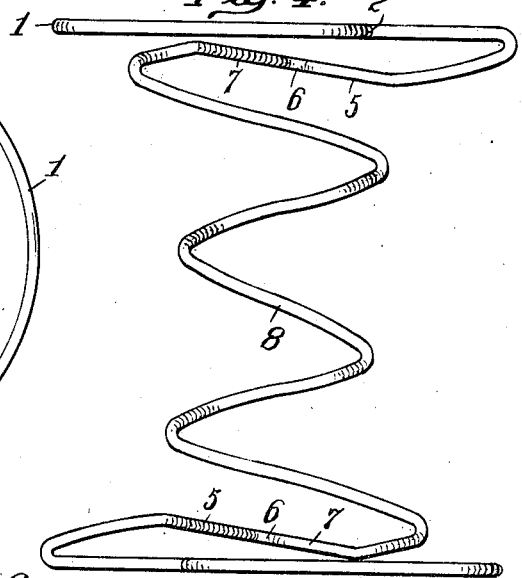
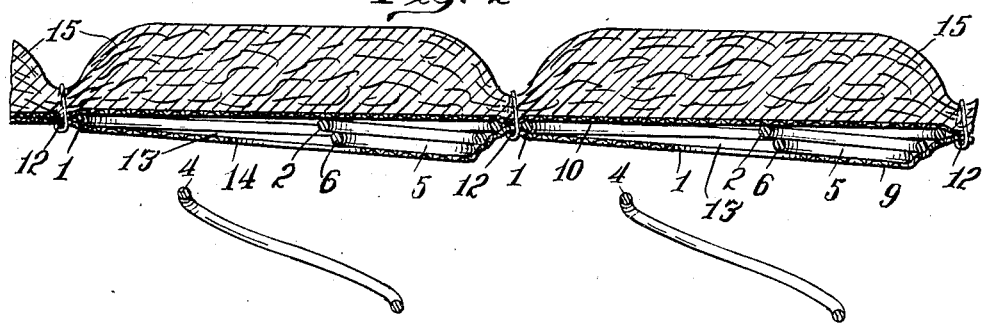
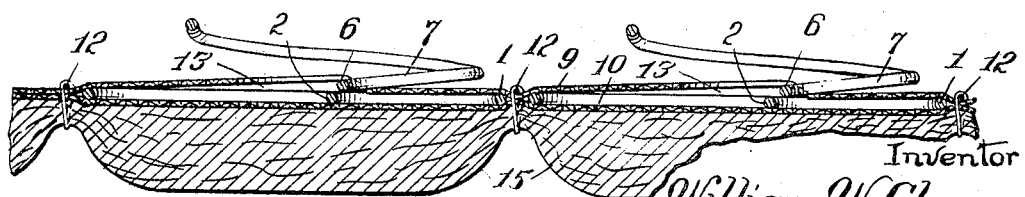
Inventor
William W. Gleason
By Rudolph M. Lotz
Attorney Patented Jan. 28, 1941

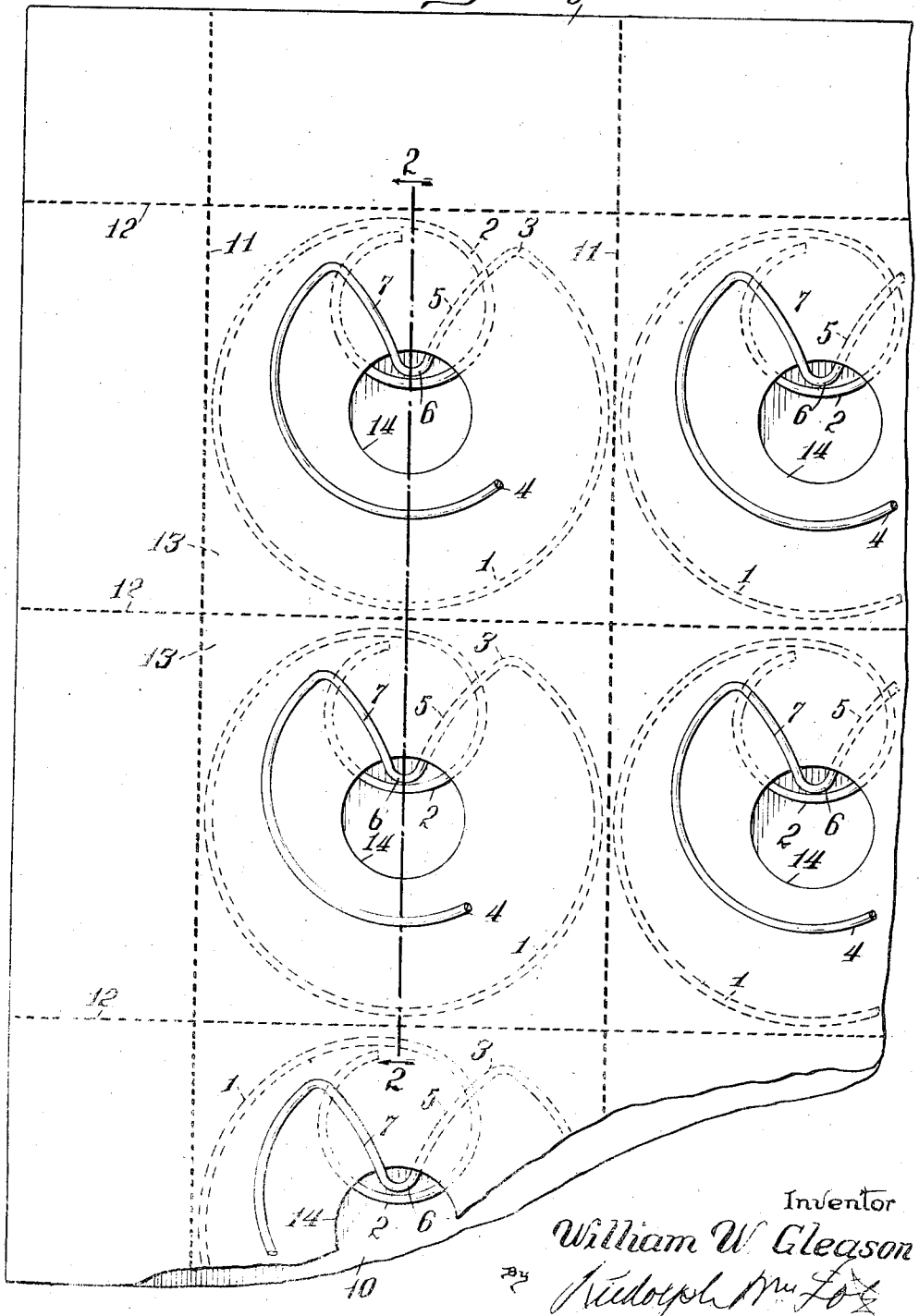

2,230,109

UNITED STATES PATENT OFFICE 2,230,109

SPRING ASSEMBLY AND SPRINGS THEREFOR

William W. Gleason, Chicago, Ill., assignor to Nachman Springfilled Corporation, Chicago, Ill., a corporation of Illinois Application September 22, 1938, Serial No. 231,204

8 Claims. (Cl. 5—351)

The present invention relates to the type of spring assembly described and claimed in the Suekoff Patent No. 1,053,675, wherein flat pockets are formed between two sheets of fabric stitched together by means of stitch chains extending longitudinally and transversely of said fabrics and wherein one wall of each pocket is provided with a substantially central opening, such as a slit or larger area opening, through which the terminal coil of a spring of the diameter substantially equal to that of the pocket is inserted for confinement within the pocket.

In spring assemblies of this type wherein the springs may be said to be more or less loosely engaged in the pockets aforesaid for spacing the top and bottom walls of the assembly from each other, the springs rotate under the influence of load thereon and in some instances the terminal coils thereof, at one end of each spring, leave the pockets in which they are confined and thereafter become canted or displaced.

The object of the present invention is to provide a spring assembly of the type described by said Suekoff patent, wherein the springs may rotate without danger of escape from the pockets of the top and bottom walls.

Another object of the invention is to provide a spring adapted for use in spring assemblies of the type aforesaid, which possesses certain advantages over the type of spring heretofore used therein and which possesses advantages with respect to other uses to which said springs may be adapted.

A suitable embodiment of the present invention is illustrated in the accompanying drawings, wherein:

Fig. 1 is a fragmentary plan sectional view of a spring assembly constructed in accordance with the invention.

Fig. 2 is a fragmentary vertical sectional view of the same taken on the line 2—2 of Fig. 1.

Fig. 3 is a plan view of one end portion of one of the upholstery springs incorporated into the assembly.

Fig. 4 is a side elevation of said spring.

Referring first to Fig. 3, it will be noted that the terminal coil of the spring therein shown (which is of the hour-glass type) is provided at the extremity of its terminal coil 1 with a loop 2 of a diameter less than the radius of the coil 1 and which projects toward the axis of the spring.

At the point 3 where the terminal coil 1 merges into the next adjacent coil 4 of the spring, there is provided an inwardly projecting arm 5 of a substantially V-shaped bend, the middle portion 6 of which is disposed in relatively close proximity to the axis of the spring, the other arm 7 of said V-shaped bend merging into the coil 4 at a point which substantially intersects the loop 2 adjacent its extremity. The said loop 2 overlaps the arm 5 between the ends of the latter. The coil 4 merges into the smaller diameter coils 8 of the spring.

As shown in Fig. 4, the terminal coils 1 of the spring are disposed in planes extending perpendicularly to the axis of the spring. The next adjacent coil 4 is disposed spirally with the said bend 5, 6, 7 being disposed in a plane extending slightly angularly to the plane of the adjacent coil 1, as more particularly shown in Fig. 2.

In Fig. 1 the two sheets of fabric 9 and 10, constituting a top or bottom wall of the spring assembly, are shown as secured together by means of parallel longitudinal stitch chains 11 and transverse parallel stitch chains 12, thereby forming substantially square flat pockets 13 between said fabric sheets.

Centrally, or substantially centrally, of each of the pockets, the wall 9 thereof is equipped with an opening 14 which may be of any desired shape, but which, for purposes of illustration, is here shown as being circular, reference being had to the said Suekoff patent first-above-mentioned and to Suekoff Patent No. 1,755,715 to show the different shapes of openings which may be substituted for the type herein shown, the latter being somewhat irregular in shape in the manufactured product.

The terminal coils 1 of the springs are relatively easily introduced into the said pockets 13 through the openings 14, due to the fact that the said openings 14 may be easily elongated by reason of the flexibility of the fabric, to admit said terminal loop 2 and the entire terminal coil 1 including the arm 5 of the substantially V-shaped formation 5, 6, 7, as clearly shown in Fig. 1.

When the springs are so engaged at opposite ends in opposed pockets of the top and bottom walls of the spring assembly, they may be rotated without danger of becoming disengaged from the said pockets 13, by reason of the fact that the middle or apex portions 6 of the V-shaped bends engage, or substantially engage, the peripheral wall of the opening 14, and thus prevent any action, such as threading action of the spring, to disengage the terminal coils thereof from the pockets, 13.

The terminal loop 2 and the next adjacent V-shaped bend of each of the springs are disposed in vertically overlapped position relatively to each other, and thus the springs become better balanced to resist canting action, under the influence of load, than is otherwise true of the hour-glass type of upholstery spring which yields most readily to load in the region of the extremities of its terminal coils. Thus the load-carrying capacity of the spring assembly equipped with the springs of this invention is more uniform over every square inch of surface than is otherwise the case.

In the instance illustrated, and as shown in Fig. 2, the outer sheets of the fabric walls of the assembly are equipped with fibre pads 15 which are stitched to said walls by means of the stitch chains 11 and 12, it being obvious, of course, that said pads may be omitted without departing from the invention as defined in and by the appended claims.

I claim as my invention:

1. In a spring assembly of the type specified including flat fabric pockets for the terminal coils of upholstery springs and provided with substantially central openings to receive the latter, a group of upholstery springs each equipped in a terminal end portion thereof with an inwardly projecting hairpin formation receiving and engaging the peripheral wall of the opening in one of the terminal coil receiving pockets of the top or bottom wall of the assembly for cooperation with said wall of said opening to permit rotation of the spring about its own axis without causing said end coil thereof to be withdrawn from said pocket.

2. In a spring assembly having top and bottom walls equipped with series of flat fabric pockets provided with substantially central openings to receive the terminal coils of upholstery springs, a series of springs each having its terminal coils of greater diameter than said openings disposed in opposed pockets of said walls and each thereof equipped in the coils thereof next adjacent said terminal coils with substantially V-shaped bends having their apexes projecting toward the spring axis, one arm of each bend being disposed within one of said pockets and the other arm disposed exteriorly of the said pocket.

3. In a spring assembly having top and bottom walls equipped with series of flat fabric pockets provided with substantially central openings to receive the terminal coils of upholstery springs, a series of springs each having its terminal coils of greater diameter than said openings disposed in opposed pockets of said walls and each thereof equipped in the coils thereof next adjacent said terminal coils with substantially V-shaped bends having their apexes projecting toward the spring axis, one arm of each bend being disposed within one of said pockets and the other arm disposed exteriorly of the said pocket, said bends of each spring being disposed in substantially vertical alignment with the extremity of the next adjacent terminal coil thereof.

4. In a spring assembly having top and bottom walls equipped with series of flat fabric pockets provided with substantially central openings to receive the terminal coils of upholstery springs, a series of springs each having its terminal coils of greater diameter than said openings disposed in opposed pockets of said walls and each thereof equipped in the coils thereof next adjacent said terminal coils with substantially V-shaped bends having their apexes projecting toward the spring axis, one arm of each bend being disposed within one of said pockets and the other arm disposed exteriorly of the said pocket, said bends of each spring being disposed in substantially vertical alignment with the extremity of the next adjacent terminal coil thereof and in close proximity thereto.

5. A spring assembly comprising top and bottom walls equipped with a group of flat pockets each having a fabric wall opposed to a fabric wall of the other, there being substantially central openings in the said fabric walls of said pockets through which the terminal coils are passed into said pockets, a group of upholstery springs having their terminal coils confined in opposed pockets of said top and bottom walls, the coils of said springs next adjacent the terminal coils thereof equipped with substantially V-shaped bends having their middle portions disposed adjacent the spring axis and their arms disposed in planes substantially perpendicular to the spring axis, one arm of each of said bends disposed within and the other arm thereof disposed exteriorly of a pocket in which the adjacent terminal coil of the spring is confined.

6. A spring assembly comprising top and bottom walls equipped with a group of flat pockets each having a fabric wall opposed to a fabric wall of the other, there being substantially central openings in the said fabric walls of said pockets through which the terminal coils are passed into said pockets, a group of upholstery springs having their terminal coils confined in opposed pockets of said top and bottom walls, the coils of said springs next adjacent the terminal coils thereof equipped with substantially V-shaped bends having their middle portions disposed adjacent the spring axis and their arms disposed in planes substantially perpendicular to the spring axis, one arm of each of said bends disposed within and the other arm thereof disposed exteriorly of a pocket in which the adjacent terminal coil of the spring is confined, each of said bends being disposed to overlap the adjacent extremity of the spring.

7. In a spring assembly of the type specified including flat fabric pockets for the terminal coils of upholstery springs and provided with substantially central openings to receive the latter, a group of upholstery springs each equipped in a terminal end portion thereof with an inwardly projecting formation receiving and engaging the peripheral wall of the opening in one of the terminal coil receiving pockets of the top or bottom wall of the assembly for cooperation with said wall of said opening to permit rotation of the spring about its own axis without causing said end coil thereof to be withdrawn from said pocket, the terminal coils of each of said springs equipped with terminal inwardly projecting bends opposed to said formations of said springs and disposed in overlapping relation to the latter.

8. An upholstery spring for a spring assembly of the type specified, having its terminal coils equipped at their extremities with inwardly projecting loop formations of relatively small diameter, said terminal coils and loop formations lying substantially in planes extending transversely of the spring axis, there being inwardly projecting substantially V-shaped bends adjacent each end of the spring disposed in overlapping relation to said loop formations and in close proximity thereto, thus providing in the spring substantially completely circular terminal coils having said inwardly projecting loop formations, the latter being adapted to bear upon the said V-shaped bends during compression of the spring.

WILLIAM W. GLEASON.